(12) United States Patent
Rogers et al.

(10) Patent No.: US 9,383,477 B2
(45) Date of Patent: Jul. 5, 2016

(54) FEEDTHROUGH ASSEMBLY FOR ELECTRICALLY CONDUCTIVE WINDING

(71) Applicant: Schlumberger Technology Corporation, Sugar Land, TX (US)

(72) Inventors: Bryan K. Rogers, Spring, TX (US); Srinand S. Karuppoor, Sugar Land, TX (US); Frank F. Espinosa, Titusville, NJ (US); Tudor I. Palaghita, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/198,436

(22) Filed: Mar. 5, 2014

(65) Prior Publication Data

US 2014/0251679 A1 Sep. 11, 2014

Related U.S. Application Data

(60) Provisional application No. 61/775,413, filed on Mar. 8, 2013.

(51) Int. Cl.
*G01V 3/00* (2006.01)
*G01V 11/00* (2006.01)
*G01V 13/00* (2006.01)
(Continued)

(52) U.S. Cl.
CPC ............... *G01V 11/002* (2013.01); *G01V 3/28* (2013.01); *G01V 13/00* (2013.01); *G01V 1/52* (2013.01); *G01V 3/30* (2013.01); *Y10T 29/49117* (2015.01);
(Continued)

(58) Field of Classification Search
CPC ........... G01V 13/00; G01V 3/28; G01V 3/30; G01V 11/002; G01V 1/52; E21B 47/01; Y10T 29/49169; Y10T 29/49117; Y10T 29/49174
USPC .......................................... 324/376, 323–375
See application file for complete search history.

(56) References Cited

U.S. PATENT DOCUMENTS

| 4,154,302 A | 5/1979 | Cugini |
| 4,949,045 A | 8/1990 | Clark et al. |

(Continued)

FOREIGN PATENT DOCUMENTS

WO 2004055950 A1 7/2004

OTHER PUBLICATIONS

International Search Report and the Written Opinion for International Application No. PCT/US2014/021218 dated Jun. 11, 2014.

*Primary Examiner* — Jay Patidar
*Assistant Examiner* — Raul Rios Russo
(74) *Attorney, Agent, or Firm* — Michael Dae

(57) ABSTRACT

A well-logging tool for geological formation has a borehole. A housing that is to be positioned within the borehole includes an opening. An electrically conductive winding is carried by the housing. A feedthrough assembly includes an elongate electrical conductor having opposing first and second ends and a medial portion extending therebetween. The first end is coupled to the electrically conductive winding. An integrally formed, monolithic, dielectric layer sounds the elongate electrical conductor and includes a first enlarged diameter end portion surrounding the first end of the elongate electrical conductor and is positioned within the opening. A reduced diameter portion surrounds the medial portion of the elongate electrical conductor.

16 Claims, 6 Drawing Sheets

(51) Int. Cl.
*G01V 3/28* (2006.01)
*G01V 3/30* (2006.01)
*G01V 1/52* (2006.01)

(52) U.S. Cl.
CPC ...... *Y10T 29/49169* (2015.01); *Y10T 29/49174* (2015.01)

(56) References Cited

U.S. PATENT DOCUMENTS

| | | |
|---|---|---|
| 7,094,967 B2 | 8/2006 | Evans et al. |
| 2002/0129945 A1 | 9/2002 | Brewer et al. |
| 2009/0107666 A1* | 4/2009 | Tchakarov et al. ...... 166/250.01 |
| 2009/0126942 A1 | 5/2009 | Kimiadi |
| 2009/0195244 A1 | 8/2009 | Mouget et al. |
| 2010/0292760 A1* | 11/2010 | Leigh .................. A61N 1/3754 607/57 |
| 2011/0160818 A1* | 6/2011 | Struve ................. A61N 1/3718 607/116 |
| 2013/0255966 A1* | 10/2013 | Palaghita et al. ............. 166/378 |
| 2014/0031911 A1* | 1/2014 | Williams ................. A61N 1/05 607/119 |
| 2014/0176139 A1* | 6/2014 | Espinosa et al. ............. 324/333 |

* cited by examiner

FEEDTHROUGH ASSEMBLY FOR ELECTRICALLY CONDUCTIVE WINDING

CROSS-REFERENCE TO RELATED APPLICATION

This application claims benefit of U.S. provisional patent application Ser. No. 61/775,413, filed Mar. 8, 2013, which is herein incorporated by reference.

BACKGROUND

Well-logging instruments are used in boreholes to make, for example, formation evaluation measurements and infer properties of the formation surrounding the borehole and the fluids in the formations. Such well-logging instruments may include resistivity logging tools that measure the resistivities of earth formations surrounding a borehole, such as in a hydrocarbon (e.g., oil, natural gas, etc.) well. One approach for performing resistivity measurements is by lowering a wireline-conveyed logging device into a borehole after the borehole is drilled.

Another approach is to make such measurements while the well is being drilled, which is referred to as logging-while-drilling (LWD) or measurement-while-drilling (MWD). LWD or MWD techniques may allow corrective actions to be taken during the drilling processes if desired. For example, borehole information, if available, in real time may be used to make adjustments to mud weights to prevent formation damage and to improve well stability. In addition, real time formation log data may be used to direct a drill bit to the desired direction (i.e., geosteering).

Some well-logging tools have coils or electrical conductors mounted on the housing forming a downhole tubular. These conductors are connected to electronic devices contained inside the housing, which protects the electronics from the harsh downhole environment. A feedthrough connects the exposed conductors to the electronic devices contained within the housing. In order to maintain good electrical conductivity under harsh operating conditions, the conductor is protected by an overmolding in rubber or a thermopolastic or thermoset polymer, e.g., Teflon®. In higher temperature downhole operating conditions above 180° C., however, Teflon® and similar polymers have a reduced lifetime and often stop functioning as a seal altogether, resulting in the loss of insulation and loss of conduction as electrical connections are exposed to the harsh downhole environmental conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A well-logging tool for geological formation has a borehole. A housing that is to be positioned within the borehole includes an opening. An electrically conductive winding is carried by the housing. A feedthrough assembly includes an elongate electrical conductor having opposing first and second ends and a medial portion extending therebetween. The first end is coupled to the electrically conductive winding. An integrally formed, monolithic, dielectric layer surrounds the elongate electrical conductor and includes a first enlarged diameter end portion surrounding the first end of the elongate electrical conductor and is positioned within the opening. A reduced diameter portion surrounds the medial portion of the elongate electrical conductor.

The integrally formed, monolithic, dielectric layer in one example includes a polyketone polymer such as a polyether ketone (PEK) polymer and in another example is formed from a polyether ether ketone (PEEK) polymer. A first contact is coupled to the first end of the elongate electrical conductor. In another example the first end of the elongate electrical conductor extends outward beyond adjacent portions of the enlarged diameter end portion of integrally formed, monolithic, dielectric layer. In another example the feedthrough assembly includes at least one first O-ring surrounding the first enlarged diameter end of the integrally formed, monolithic, dielectric layer. At least one electronic device is carried by the housing and coupled to the second end of the elongate electrical conductor.

A method of making a well-logging tool for a geological formation having a borehole therein is also disclosed.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Figure 1:
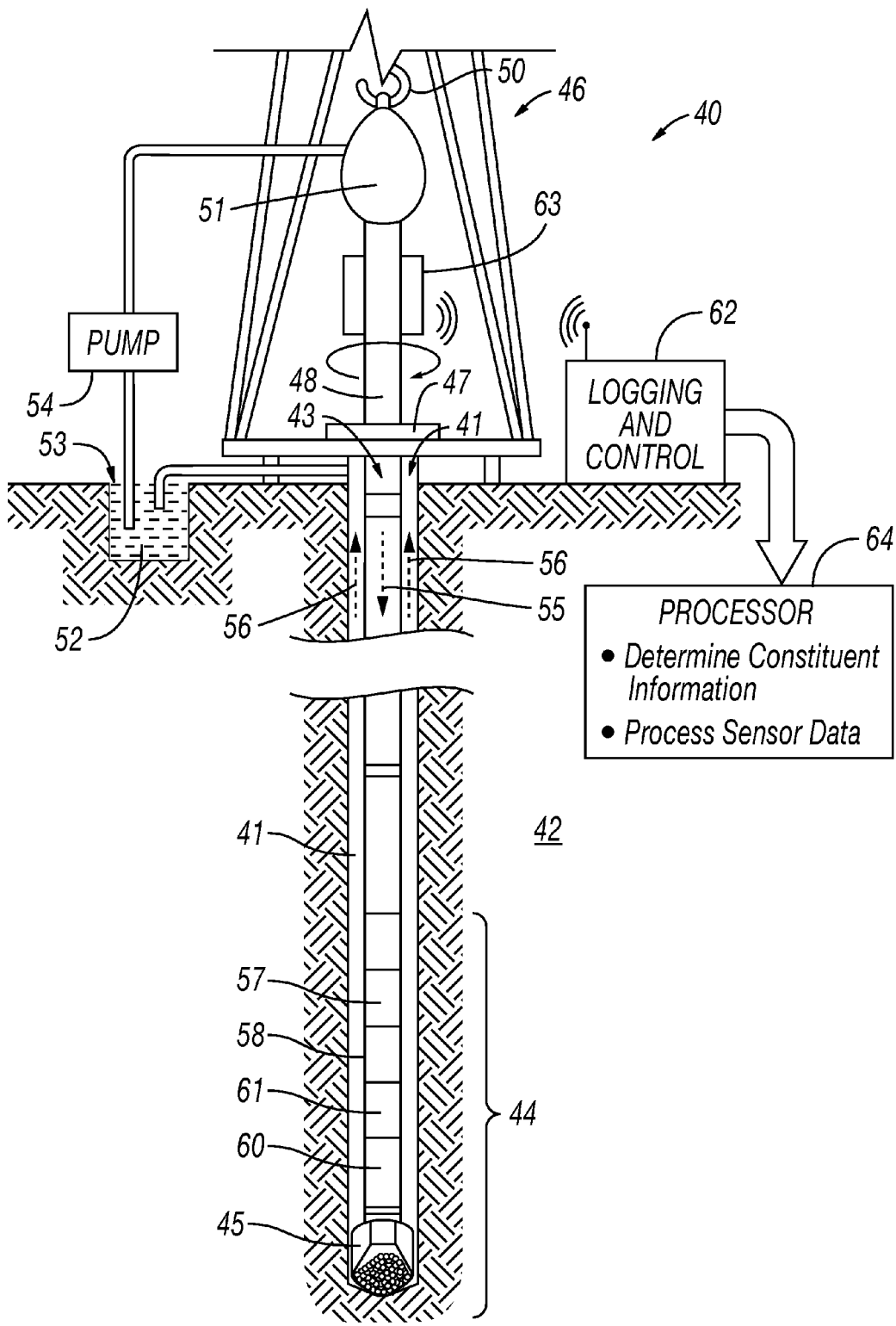
FIG. 1 is a schematic diagram showing a well-logging tool that may include a feedthrough assembly in accordance with an example embodiment.

FIG. 1 illustrates a well site system 40 in which various embodiments of a feedthrough assembly described below may be implemented. In the illustrated example, the well site is a land-based site, but the techniques described herein may also be used with a water or offshore-based well site as well. In this example system, a borehole 41 is formed in a subsurface or geological formation 42 by rotary drilling, for example. Some embodiments may also use directional drilling, as will be described below.

Although this description proceeds with the description of a Drilling and Measurement (D&M) system that includes a drill string, it should be understood that a wireline drilling and logging system may be used. The feedthrough assembly as described below may be used with either system.

A drill string 43 is suspended within the borehole 41 and has a bottom hole assembly ("BHA") 44 which includes a drill bit 45 at its lower end. The system 40 further includes a platform and derrick assembly 46 positioned over the borehole 41. The assembly 46 illustratively includes a rotary table 47, kelly 48, hook 50 and rotary swivel 51. The drill string 43 in this example may be rotated by the rotary table 47, which engages the kelly 48 at the upper end of the drill string. The drill string 43 is illustratively suspended from the hook 50, which is attached to a traveling block (not shown). The kelly 48 and the rotary swivel 51 permits rotation of the drill string relative to the hook. A top drive system (not shown) may also be used to rotate and axially move the drill string 43, for example.

In the present example, the system 40 may further include drilling fluid or mud 52 stored in a pit 53 formed at the well site (or a tank) for such purpose. A pump 54 delivers the drilling fluid 52 to the interior of the drill string 43 via a port in the swivel 51, causing the drilling fluid to flow downwardly through the drill string as indicated by the directional arrow 55. The drilling fluid exits the drill string 43 via ports or nozzles (not shown) in the drill bit 45, and then circulates upwardly through an annular space ("annulus") between the outside of the drill string and the wall of the borehole, as indicated by the directional arrows 56. The drilling fluid lubricates the drill bit 45 and carries formation cuttings up to the surface as it is cleaned and returned to the pit 53 for recirculation.

The BHA 44 of the illustrated embodiment may include a logging-while-drilling ("LWD") module 57, a measuring-while-drilling ("MWD") module 58, a rotary steerable directional drilling system and motor 60, and the drill bit 45. These modules are part of downhole tubulars formed from respective housings as illustrated.

The LWD module 57 may be housed in a special type of drill collar, as is known in the art, and may include one or more types of well-logging instruments. It will also be understood that optional LWD and/or MWD modules 61 may also be used in some embodiments. (References, throughout, to a module at the position of 57 may mean a module at the position of 61 as well). The LWD module 57 may include capabilities for measuring, processing, and storing information, as well as for communicating the information with the surface equipment, e.g., to a logging and control unit 62, which may include a computer and/or other processors for decoding information transmitted from the MWD and LWD modules 57, 58 and recording and calculating parameters therefrom. The information provided by the MWD and LWD modules 57, 58 may be provided to a processor 64 (which may be off site, or in some embodiments may be on-site as part of the logging and control unit 62, etc.) for determining volumetric and other information regarding constituents within the geological formation 42.

Figure 2:
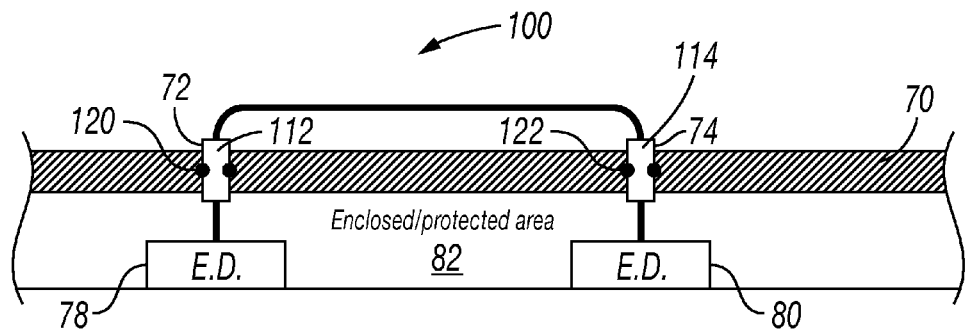
FIG. 2 is an enlarged sectional view of a portion of the well-logging tool of FIG. 1 and showing a feedthrough assembly in accordance with an example embodiment.

Each of the modules is typically formed as a downhole tubular that includes a housing 70 such as shown schematically in FIG. 2 that is received within the borehole. As illustrated in the example of FIG. 2, the housing 70 has first and second openings 72, 74 that receive the feedthrough assembly shown generally at 100, in accordance with a non-limiting example, and which connects at either of its ends in this example to respective first and second electronic devices (E.D.) 78, 80 carried by the housing within an enclosed protected area 82.

A wireline cable may be used that includes a standard cable head connected at its lower end to a logging tool with a wireline cable extending to the surface of the borehole. During a logging operation, data may be transmitted from the logging tool to the wireline cable through the cable head and into the logging and control system 62 such as shown in FIG. 1. The housing 70 forming part of the downhole tubular may include one or more pressure bulkheads that enclose a protected area as an enclosure and contain the electronic devices, including sensors for downhole logging, including processors and other electronics. The bulkhead may form a pressure housing as part of the downhole tubular.

Figure 3:
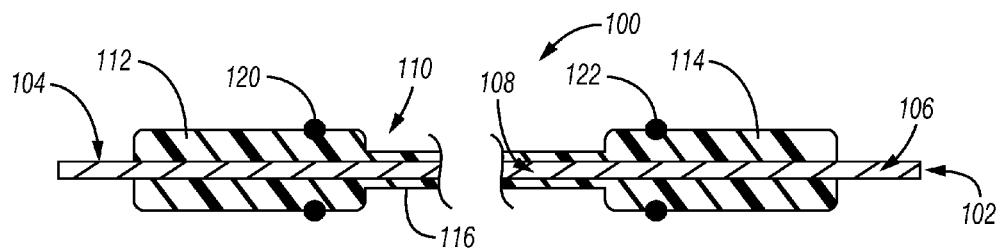
FIG. 3 is a schematic cross-sectional view of an embodiment of the feedthrough assembly.

FIG. 3 shows an example feedthrough assembly 100 that may be used with the well-logging tool shown in FIG. 1. The feedthrough assembly 100 includes an elongate electrical conductor 102 having opposing first and second ends 104, 106 and a medial portion 108 extending therebetween. An integrally formed, monolithic, dielectric layer 110 surrounds the elongate electrical conductor and includes a first enlarged diameter end portion 112 surrounding the first end of the elongate electrical conductor and in use is positioned within the first opening 72 of the housing, such as shown in the example of FIG. 2.

A second enlarged diameter end portion 114 surrounds the second end 106 of the elongate electrical conductor and in use is positioned within the second opening 74 as shown in FIG. 2, for example. A reduced diameter portion 116 surrounds the medial portion 108 of the elongate electrical conductor. The conductor, in an example, is formed from copper wire or other conductive material. As illustrated, the first and second ends 104, 106 of the elongate electrical conductor each extends outward beyond adjacent portions of the respective first and second enlarged diameter end portions 112, 114 of the integrally formed, monolithic, dielectric layer 110.

A first O-ring 120 surrounds the first enlarged diameter end portion 112 of the integrally formed, monolithic, dielectric layer 110 and provides sealing with the housing 70 when the feedthrough is received within the first opening 72 (FIG. 2). The diameter of that first opening 72 corresponds substantially with the diameter of the first enlarged diameter end portion to allow a frictional fit and allow the first O-ring 120 to form a seal with the housing. A second O-ring 122 surrounds the second enlarged diameter end portion 114 of the integrally formed, monolithic, dielectric layer and is dimensioned relative to the second opening 74 in the housing to form a seal therewith. The electronic devices 78, 80 are carried by the housing and coupled to the respective first and second end of the feedthrough assembly 100 such as shown in FIG. 2. The seals formed by the respective O-rings with the housing prevent downhole fluids from leaking into the housing 70 and the enclosed/protected area 82.

In the example embodiment shown in FIG. 3, the integrally formed, monolithic, dielectric layer 110 that surrounds the elongate electrical conductor 102 may be formed from a polyketone polymer such as a Polyether Ketone (PEK) polymer, and in another example as a Polyether Ether Ketone (PEEK) polymer material. Other examples include Polyether Ketone Ether Ketone Ketone (PEKEKK) or Polyether Ketone Ketone (PEKK) or similar materials. It is possible for the first and second enlarged diameter end portions 112, 114 that surround the respective first and second ends 104, 106 of the elongate electrical conductor to be molded onto each end from a polyketone material, and the reduced diameter portion 116 may also be molded simultaneously with the enlarged diameter end portions.

It is also possible to injection mold polymers such as a PEEK polymer onto the conductor and form the enlarged diameter end portion and reduced diameter portion. Mechanical roughening, plasma, corona treatment, flame treatment or other chemical treatments may be used to prepare the surface of the elongate electrical conductor. The electrical conductor could already have a polymer coating that is prepared to receive the integrally formed, monolithic, dielectric layer. A hot gas such as nitrogen may be injected onto wire insulation to preheat and melt it before the first and second enlarged diameter end portions are injection molded. Other manufacturing techniques and embodiments may be used. It is possible to combine a wire insulation extrusion process with the feedthrough molding processes and extrude insulation over the elongate electrical conductor. In another example the elongate electrical conductor 102 may be formed from stranded wire. Any O-rings may be formed from the same PEK/PEEK or other polyketone material or from different materials as long as a seal is provided between the opening and the respective enlarged diameter end portion.

Figure 4:
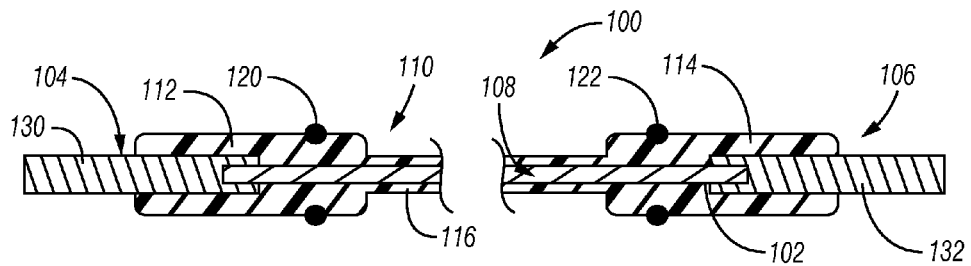
FIG. 4 is a schematic cross-sectional view of another embodiment of the feedthrough assembly.

FIG. 4 is another embodiment of the feedthrough assembly 100' similar to that shown in FIG. 3 with similar components, but the feedthrough assembly 100' includes a first contact 130' coupled to the first end of the elongate electrical conductor and a second contact 133' coupled to the second end of the elongate electrical conductor. The contacts extend beyond the adjacent portions of the enlarged diameter end portions as illustrated. The O-rings 120', 122' of the embodiment shown in FIG. 3 are the same as that embodiment in FIG. 4. Similar forming techniques may be used for both embodiments.

Figure 5:
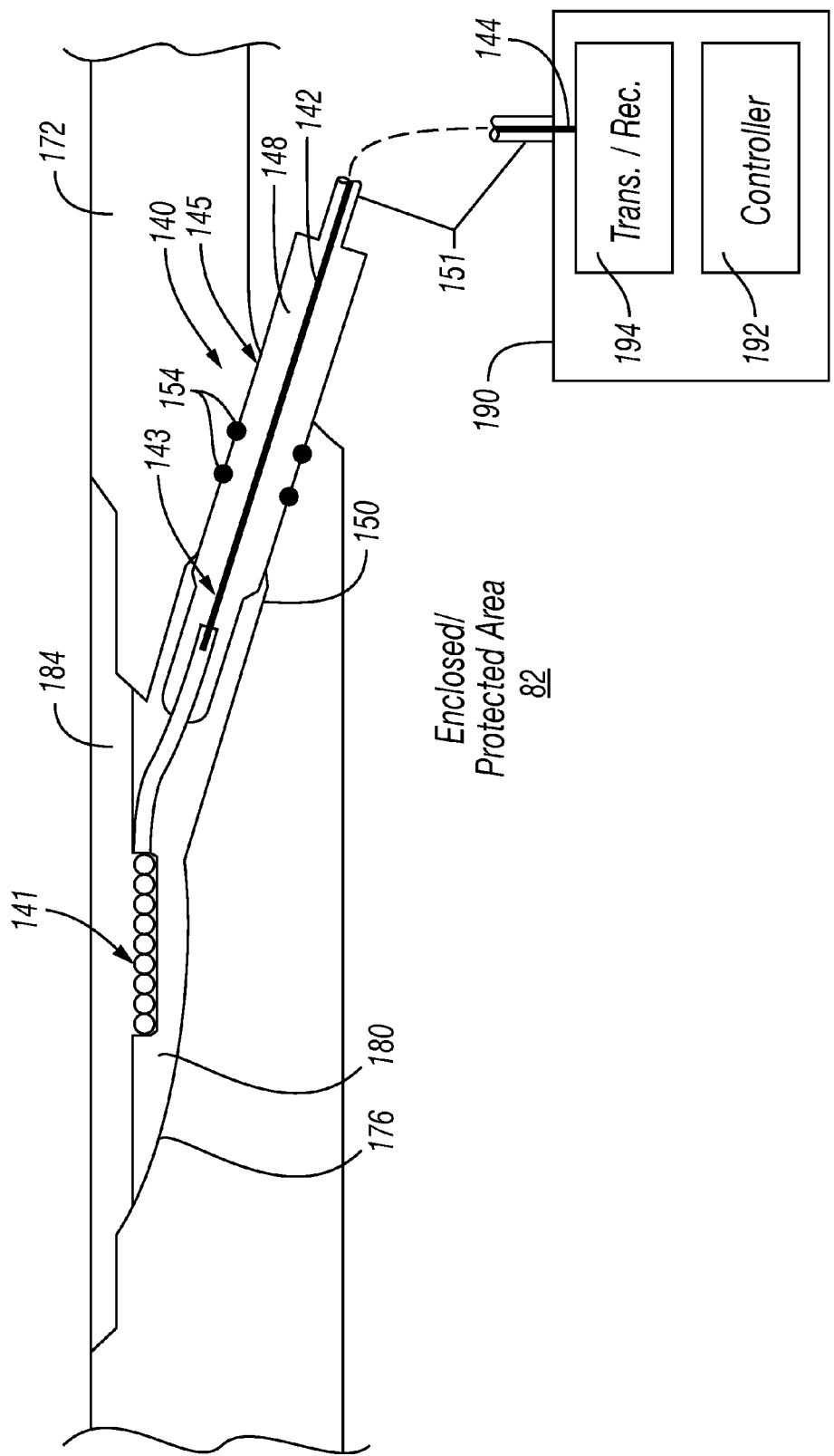
FIG. 5 is a schematic cross-sectional view of an electrically conductive winding as an antenna assembly coupled to a feedthrough assembly in accordance with a non-limiting example.

FIG. 5 is an embodiment of the feedthrough assembly shown at 140 in which an electrically conductive winding as an antenna assembly or coil 141 is carried by the housing 172 and coupled to the feedthrough assembly 140, which in this example includes an elongate electrical conductor 142 having the opposing first and second ends 143, 144 and a medial portion extending therebetween. The first end 143 is coupled to the electrically conductive winding formed as the antenna coil 141. This example feedthrough assembly 140 shown in FIG. 5 includes a integrally formed, monolithic, dielectric layer 145 surrounding the elongate electrical conductor 142 and including a first enlarged diameter end portion 148 surrounding the first end of the elongate electrical conductor (and positioned within an opening 150 forming a feedthrough port of the housing) and with a reduced diameter body portion 151 surrounding the medial portion of the elongate electrical conductor, and the second end 144 coupled to at least one electronic device carried by the housing, which defines an enclosed/protected area. At least one first O-ring 154 surrounds the first enlarged diameter end portion of the integrally formed, monolithic, dielectric layer 145. Multiple O-rings as a pair of O-rings are shown in this case in FIG. 5 to provide a better seal with the housing 172.

The feedthrough assembly 140 connects to the antenna assembly formed as an antenna coil 141, which operates similar to a sensor that can be part of a resistivity tool as a non-limiting example used in well-logging tools such as explained with reference to FIG. 1. The feedthrough assembly 140 includes a tapered tip as part of the enlarged body portion 143. In this particular example, the conductor may extend outward beyond the tip and be received into a lead from the antenna coil or as in the example shown in FIG. 5, connect into an opening within a lead from the antenna coil and forming a friction fit. During assembly, the feedthrough will be inserted through the opening 150. The antenna coil is in its antenna coil bed location and the lead from the antenna coil received into the feedthrough to connect to the conductor. Although one configuration with the tapered tip for the feedthrough is shown, other configurations may be used. The enlarged diameter end portion 148 would be molded to include the tapered tip as illustrated.

Figure 6:
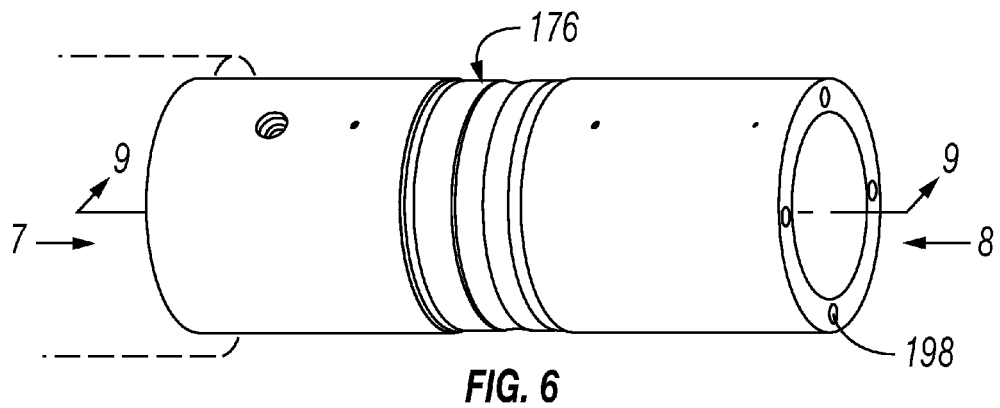
FIG. 6 is a perspective view of a cylindrical antenna housing and showing a circumferential recess that receives the electrically conductive winding as the antenna assembly shown in FIG. 5.

The antenna coil 141 is carried by the housing, which is formed as a sensor housing 172, and which can be part of a resistivity tool used with the well-logging tool as explained with reference to FIG. 1. As illustrated in FIG. 5, the sensor housing 172 is formed as a cylindrical housing formed from a metal material and forming in this example a sub-collar as part of a larger antenna assembly. The cylindrical antenna or sensor housing 172 can be referred to interchangeably as a collar. The sensor housing 172 includes a circumferential recess 176 that is machined in its peripheral surface as illustrated in FIG. 6. This recess is concave into the housing surface as best shown in the cross-section of FIG. 5 and a dielectric material layer 180 fills the circumferential recess 176. An epoxy or fiber composite or other similar composite may fill the recess as a non-limiting example.

As perhaps best shown in FIG. 5, a dielectric material layer 180 partially fills the recess 176 to a height almost to the outer surface of the cylindrical housing 172 and is machined with the configuration as shown in FIG. 6 in this example. The antenna coil 141 is supported by the dielectric material layer, which forms a coil bed. In this example, the antenna coil 141 is supported by the dielectric material layer as a coil bed and is not encapsulated, although in another example, the dielectric material could encapsulate the antenna coil. The dielectric material layer 180 forms the coil bed. In the example of FIG. 5, an antenna cover 184 optionally covers over the dielectric material layer and the antenna coil and can be formed from a rubber or other polymeric material.

As illustrated in FIG. 5, the first end 143 of the feedthrough assembly 140 is coupled to the antenna coil 141 and the second end 144 is connected to electronic device resistivity processing circuitry 190 in this example, which determines an electrical resistivity of the geological formation using the antenna coil 141 as the sensor. This resistivity processing circuitry 190 includes a controller 192 and a transmitter and/or receiver 194 coupled thereto. Multiple antenna assemblies formed from one or more coils may be spaced apart along the drill string illustrated in FIG. 1 to transmit and receive signals to and from the geological formation. As such, the controller 192 may interface with multiple transmitters and receivers for respective antenna assemblies. Transmitters and receivers may also be coupled to multiple antenna assemblies and shared with each other and a given antenna assembly may be used to alternate between transmitting and receiving in some embodiments.

In one example, the controller 192 may be carried on a drill string in the tool section behind the drill bit in an electronic chassis. The controller 192 may collect resistivity measurement data and store it for later retrieval such as when a drill string is removed from the borehole or it may communicate the resistivity measurement data up to a well-logging control center as the logging and control unit 162 shown in FIG. 1 outside of the well via telemetry or wire connection. The controller 192 may first process the measured values to make resistivity determinations or it may collect raw measurement data for later processing. The controller could be located on the surface in another example.

Figure 7:
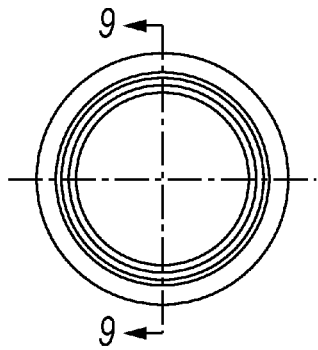
FIG. 7 is an end view of the antenna housing of FIG. 6 looking in the direction of arrow 7.
Figure 8:
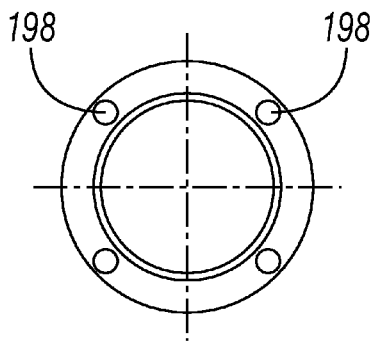
FIG. 8 is an end view of the antenna housing of FIG. 6 looking in the direction of arrow 8.
Figure 9:
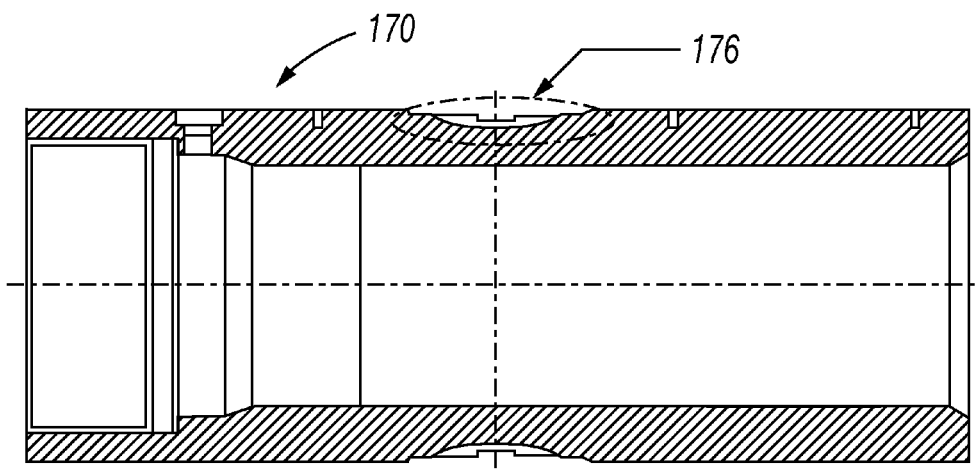
FIG. 9 is a sectional view of the antenna housing taken along line 6-6 of FIG. 6.

FIG. 7 is an end view of the housing looking in the direction of arrow 7 and FIG. 8 is an end view looking in the direction of arrow 8 of FIG. 3. FIG. 8 shows threaded receiving holes 198 to receive another collar or part of a sensor body of a well-logging tool such as shown in FIG. 1. FIG. 9 shows details of the housing. In this example, the feedthrough port 150 is formed in the housing shown in FIG. 5 and is filled with epoxy. Different epoxy base composites may be used.

Other feedthrough assemblies may be used depending on the design and end requirements. It is possible to use various mechanical joining methods, including crimping, welding, or soldering. Although O-rings and seals are illustrated, other external features may be used. It is possible to form a multi-conductor and/or multi-pin connector and feedthrough assembly either in a side-by-side configuration or coaxial configuration.

Figure 10:
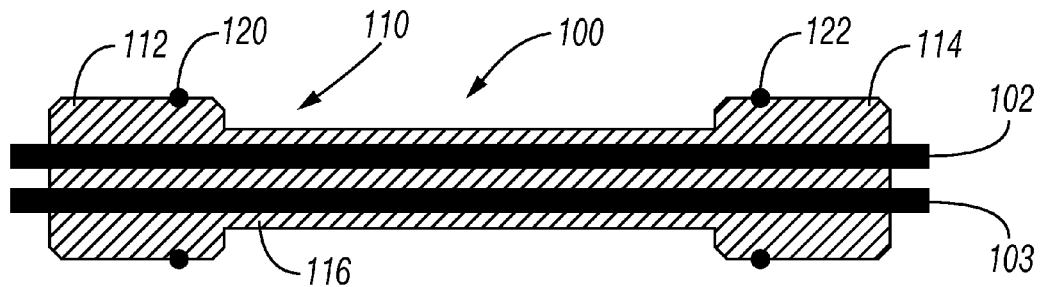
FIG. 10 is a schematic cross-sectional view of an embodiment of the feedthrough assembly similar to that shown in FIG. 1 showing a second elongate electrical conductor.
Figure 11:
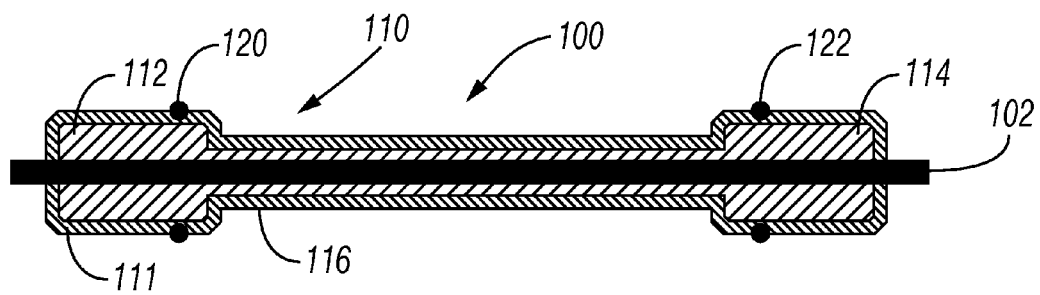
FIGS. 11 and 12 are schematic cross-sectional views of the feedthrough assembly and showing a second integrally formed, monolithic, dielectric layer.
Figure 12:
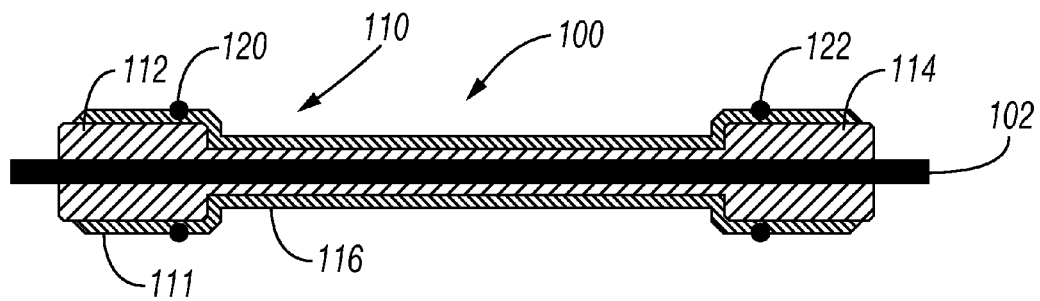
Figure 13:
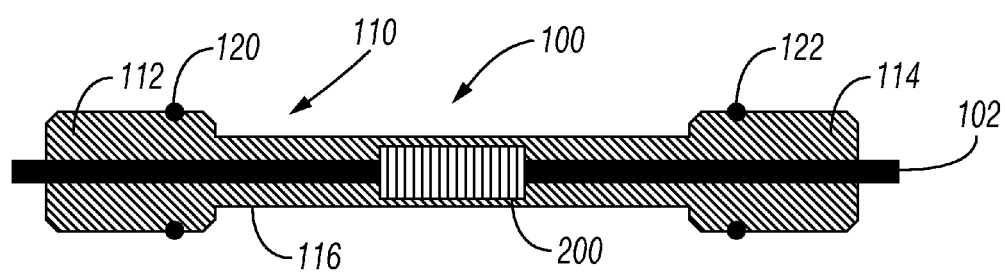
FIGS. 13 and 14 are schematic cross-sectional views of the feedthrough assembly showing an electronic device carried by the elongate electrical conductor.
Figure 14:
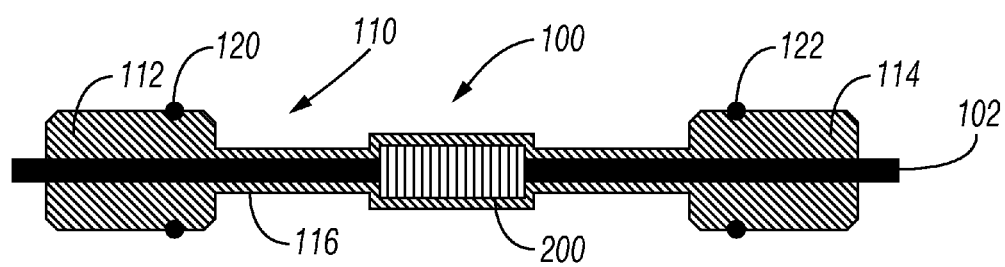

FIGS. 10-14 are other sectional views similar to that shown in FIG. 3. In FIG. 10, the elongate electrical conductor is formed as two separate conductor members 102, 103 as illustrated. FIGS. 11 and 12 show an additional or second integrally formed, monolithic, dielectric layer 111 positioned over the first integrally formed, monolithic, dielectric layer 110. FIGS. 13 and 14 show an electronic device 200 carried by the elongate electrical conductor and incorporated inside the integrally formed, monolithic, dielectric layer 110. This electronic device 200 could be other electronics or a sensor or even a portion of the elongate electrical conductor formed into an electrical coil or other winding.

This application is related to copending patent applications entitled, "FEEDTHROUGH ASSEMBLY FOR WELL-LOGGING TOOL," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A well-logging tool for a geological formation having a borehole therein, comprising:
   a housing to be positioned within the borehole and having an opening therein;
   an electrically conductive winding carried by said housing; and
   a feedthrough assembly comprising
      an elongate electrical conductor having opposing first and second ends and a medial portion extending therebetween, the first end coupled to said electrically conductive winding, and
      an integrally formed, monolithic, dielectric layer surrounding said elongate electrical conductor and comprising
         a first enlarged diameter end portion surrounding the first end of said elongate electrical conductor and being positioned within the opening, and
         a reduced diameter body portion surrounding the medial portion of said elongate electrical conductor,
      wherein said first end is coupled to said electrically conductive winding inside said integrally formed, monolithic, dielectric layer.

2. The well-logging tool according to claim 1, wherein said integrally formed, monolithic, dielectric layer comprises a polyketone polymer.

3. The well-logging tool according to claim 1, wherein said integrally formed, monolithic, dielectric layer comprises a Polyether Ketone (PEK) or Polyether Ether Ketone (PEEK) polymer.

4. The well-logging tool according to claim 1, wherein said feedthrough assembly further comprises a first contact coupled to the first end of said elongate electrical conductor.

5. The well-logging tool according to claim 1, wherein the first end of said elongate electrical conductor extends outward beyond adjacent portions of the enlarged diameter end portion of said integrally formed, monolithic, dielectric layer.

6. The well-logging tool according to claim 1, wherein said feedthrough assembly further comprises at least one first O-ring surrounding the first enlarged diameter end of said integrally formed, monolithic, dielectric layer.

7. The well-logging tool according to claim 1, further comprising at least one electronic device carried by said housing and coupled to the second end of said elgongate electrical conductor.

8. The well-logging tool according to claim 1, wherein said first end is coupled to said electrically conductive winding inside said integrally formed, monolithic, dielectric layer formed around said first end of said elongate electrical conductor.

9. The well-logging tool according to claim 1, wherein said integrally formed, monolithic, dielectric layer formed around said first end of said elongate electrical conductor further comprises a tapered portion within which said first end couples to said electrically conductive winding.

10. A well-logging tool for a geological formation having a borehole therein, comprising:
    a housing to be positioned within the borehole and having an opening therein;
    an electrically conductive winding carried by said housing; and
    a feedthrough assembly comprising
       an elongate electrical conductor having opposing first and second ends and a medial portion extending therebetween, the first end coupled to said electrically conductive winding, and
       an integrally formed, monolithic, dielectric layer surrounding said elongate electrical conductor and comprising a Polyether Ether Ketone (PEEK) polymer, said integrally formed, monolithic, dielectric layer comprising
          a first enlarged diameter end portion surrounding the first end of said elongate electrical conductor and being positioned within the opening, and
          a reduced diameter body portion surrounding the medial portion of said elongate electrical conductor; and
       a least one electronic device carried by said housing and coupled to the second end of said elongate electrical conductor,
    wherein said first end is coupled to said electrically conductive winding inside said integrally formed, monolithic, dielectric layer.

11. The well-logging tool according to claim 10, wherein said feedthrough assembly further comprises a first contact coupled to the first end of said elongate electrical conductor.

12. The well-logging tool according to claim 10, wherein the first end of said elongate electrical conductor extends outward beyond adjacent portions of the enlarged diameter end portion of said integrally formed, monolithic, dielectric layer.

13. The well-logging tool according to claim 10, wherein said feedthrough assembly further comprises at least one first O-ring surrounding the first enlarged diameter end of said integrally formed, monolithic, dielectric layer.

14. The well-logging tool according to claim 10, further comprising at least one electronic device carried by said housing and coupled to the second end of said elgongate electrical conductor.

15. The well-logging tool according to claim 10, wherein said first end is coupled to said electrically conductive winding inside said integrally formed, monolithic, dielectric layer formed around said first end of said elongate electrical conductor.

16. The well-logging tool according to claim 10, wherein said integrally formed, monolithic, dielectric layer formed around said first end of said elongate electrical conductor further comprises a tapered portion within which said first end couples to said electrically conductive winding.

\* \* \* \* \*